(12) United States Patent
Barker et al.

(10) Patent No.: US 9,190,715 B2
(45) Date of Patent: Nov. 17, 2015

(54) METHOD AND APPARATUS FOR ANTENNA RADIATION PATTERN SWEEPING

(75) Inventors: David Edwin Barker, Stockport (GB); Keith Hal Radousky, Atlanta, GA (US)

(73) Assignee: Quintel Technology Limited, Bristol (GB)

( * ) Notice: Subject to any disclaimer, the term of this patent is extended or adjusted under 35 U.S.C. 154(b) by 541 days.

(21) Appl. No.: 13/009,614

(22) Filed: Jan. 19, 2011

(65) Prior Publication Data

US 2011/0199992 A1    Aug. 18, 2011

Related U.S. Application Data

(60) Provisional application No. 61/296,394, filed on Jan. 19, 2010.

(51) Int. Cl.
| | |
|---|---|
| H04W 72/04 | (2009.01) |
| H01Q 1/24 | (2006.01) |
| H01Q 3/26 | (2006.01) |
| H04W 16/28 | (2009.01) |

(52) U.S. Cl.
CPC .............. *H01Q 1/246* (2013.01); *H01Q 3/26* (2013.01); *H04W 16/28* (2013.01)

(58) Field of Classification Search
USPC ........................................ 370/329
See application file for complete search history.

(56) References Cited

U.S. PATENT DOCUMENTS

| | | | | |
|---|---|---|---|---|
| 5,260,968 | A | * | 11/1993 | Gardner et al. ............ 375/347 |
| 5,917,455 | A | * | 6/1999 | Huynh et al. ............ 343/792.5 |
| 7,120,431 | B1 | | 10/2006 | Huo et al. |
| 2004/0038658 | A1 | * | 2/2004 | Gurelli et al. ............ 455/226.3 |
| 2004/0063467 | A1 | | 4/2004 | Shapira et al. |
| 2004/0080455 | A1 | * | 4/2004 | Lee ............ 343/700 MS |
| 2004/0229651 | A1 | | 11/2004 | Hulkkonen et al. |
| 2005/0070266 | A1 | | 3/2005 | Senarath et al. |
| 2005/0184827 | A1 | | 8/2005 | Pallone et al. |
| 2006/0183503 | A1 | | 8/2006 | Goldberg |
| 2007/0002805 | A1 | | 1/2007 | Laurila et al. |
| 2008/0261613 | A1 | | 10/2008 | Anderson et al. |
| 2010/0159930 | A1 | * | 6/2010 | Hagerman et al. ............ 455/436 |

FOREIGN PATENT DOCUMENTS

| | | |
|---|---|---|
| GB | 2 361 385 | 10/2001 |
| WO | WO 2010/073101 | 7/2010 |

OTHER PUBLICATIONS

Copy of PCT Search Report and Written Opinion for PCT/US 11/21720, dated Mar. 21, 2011, copy consists of 10 pages.
European Search Report and Written Opinion of PCT/US2011/021720, dated May 4, 2015, pp. 1-8.

* cited by examiner

*Primary Examiner* — Sulaiman Nooristany

(57) ABSTRACT

A system and method for antenna radiation pattern sweeping in wireless networks, e.g., cellular networks, are disclosed. For example, the system comprises a first base station associated with a first antenna assembly for providing a first antenna radiation pattern over a first footprint of a first cell, a second base station associated with a second antenna assembly for providing a second antenna radiation pattern over a second footprint of a second cell, wherein there is an overlap between the first footprint and the second footprint, and a controller for controlling the first base station and the second base station to continuously provide a variation of the first antenna radiation pattern and the second antenna radiation pattern in a co-ordinated manner for maintaining the overlap between the first footprint and the second footprint.

18 Claims, 7 Drawing Sheets

METHOD AND APPARATUS FOR ANTENNA RADIATION PATTERN SWEEPING

This application claims the benefit of U.S. Provisional Application No. 61/296,394 filed on Jan. 19, 2010, which is herein incorporated by reference.

FIELD OF THE DISCLOSURE

The present disclosure generally relates to the field of wireless communications, and more specifically relates to antenna radiation pattern sweeping in wireless networks, e.g., cellular networks.

BACKGROUND

Many communications systems (such as Long Term Evolution (LTE) 3G radio, High Speed Packet Access (HSPA), Worldwide Interoperability for Microwave Access (WiMAX) systems and the like) are designed to use multiple input, multiple output (MIMO) antenna techniques which compute optimal power and phase weightings into two or more transmission antennas and one or more receiving antennas to maximize the carrier-to-interference ratio (C/I) on a per-user basis and hence maximize data throughput rates. MIMO implementations rely upon using two or more de-correlated or partially orthogonal different multi-path radio channels in which data can be transmitted. Different located sites will offer complete de-correlated or much more orthogonal radio channels. MIMO techniques include the known techniques of Spatial Multiplexing and Transmit Diversity. In contrast, Opportunistic Beamforming, Phase Sweeping and Antenna Hopping are simple implementations of the MIMO family, or alternatives without complex processing overheads to the more recent MIMO processing algorithms used with communications systems such as LTE and WiMAX. In many ways, Opportunistic Beamforming, Phase Sweeping and Antenna Hopping techniques could be termed opportunistic (simple) MIMO techniques as a means to achieve gains rather than optimal (complex weighted) MIMO systems. However, Opportunistic Beamforming, Antenna Hopping, Phase Sweeping and even MIMO techniques are employed at a single cell or sector level, and not operated in a co-ordinated network level manner.

SUMMARY OF THE DISCLOSURE

In one embodiment, the present disclosure provides a system and method for antenna radiation pattern sweeping in wireless networks, e.g., cellular networks. For example, the system comprises a first base station associated with a first antenna assembly for providing a first antenna radiation pattern over a first footprint of a first cell, a second base station associated with a second antenna assembly for providing a second antenna radiation pattern over a second footprint of a second cell, wherein there is an overlap between the first footprint and the second footprint, and a controller for controlling the first base station and the second base station to continuously provide a variation of the first antenna radiation pattern and the second antenna radiation pattern in a co-ordinated manner for maintaining the overlap between the first footprint and the second footprint.

BRIEF DESCRIPTION OF THE DRAWINGS

The teaching of the present disclosure can be readily understood by considering the following detailed description in conjunction with the accompanying drawings, in which:

FIG. 1 illustrates one embodiment of the current disclosure of providing continuously and contiguously varying radiation beam patterns across a plurality of base station cells as to move cell boundaries around and to intentionally vary the C/I signal quality experienced by mobile users to which a scheduling algorithm can respond to;

To facilitate understanding, identical reference numerals have been used, where possible, to designate identical elements that are common to the figures.

DETAILED DESCRIPTION

Figure 1:
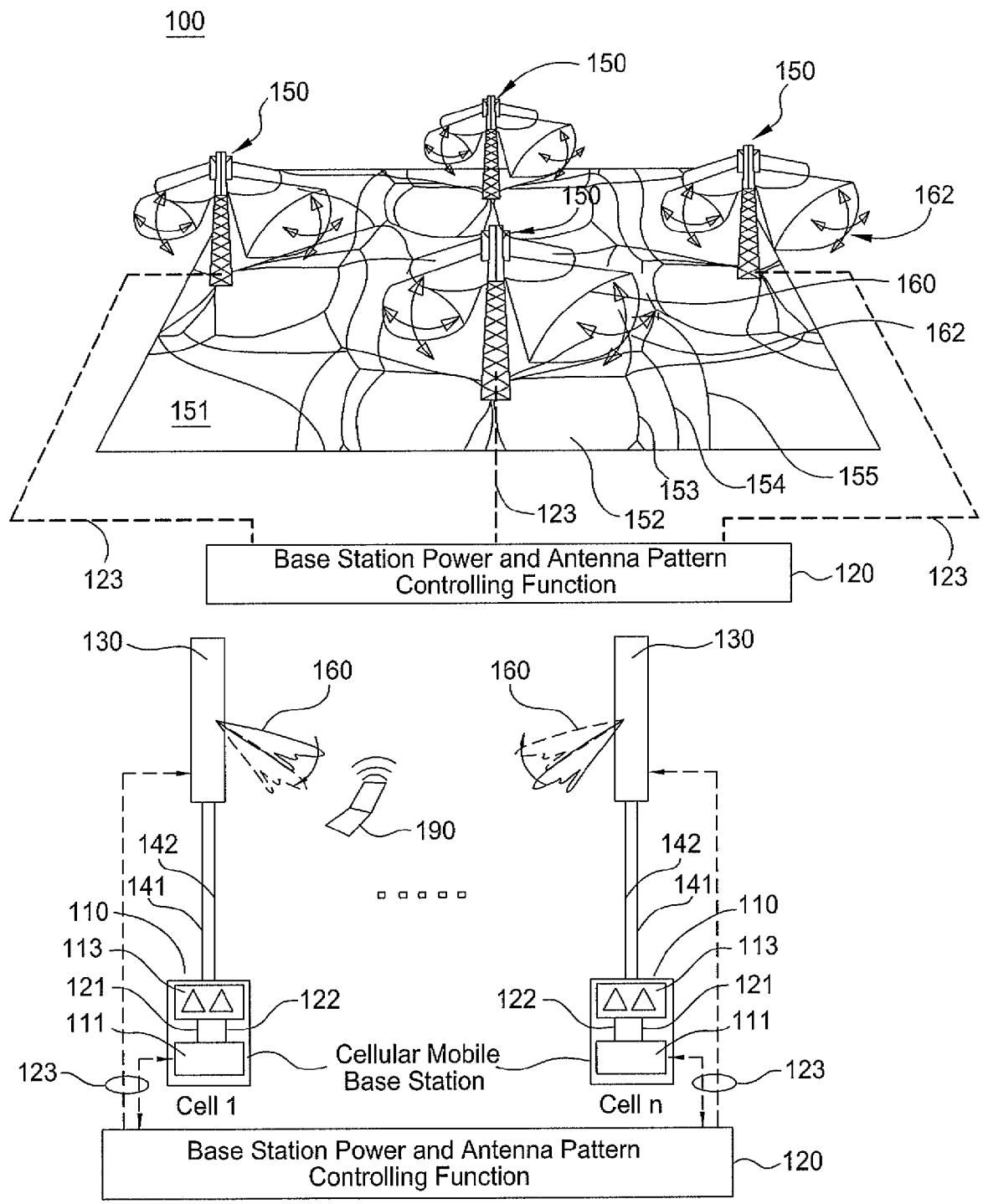

It should be noted that co-ordinated tilt switching techniques can be used with communications systems using MIMO techniques. For example, these methods may rely on co-ordinated discrete "switching" of adjacent sector beam tilts on a co-ordinated frame by frame basis. The result is that no user is ever at cell edges when being served with data. As such, the technique does not rely upon feedback from the user terminals as to the user downlink signal quality and allows for a scheduling algorithm (located at the base station) to make the decision of when to schedule data to the user(s). The technique forces a two-state signal quality rather than a continuously varying state of signal quality; as such, the method assumes knowledge when it has opportunity to send data and to which users as a function of time. However, this technique is not optimized for all users since a bi-state tilt switching process means that (fixed location) users will experience only two states of signal quality, and whilst one state will be better than the other state, it may not be the optimal signal quality. The optimal or peak signal quality may exist under different tilt combinations.

In one embodiment, the present disclosure relates to a network of phased array antennas which have steerable or reconfigurable radiation beams. The antennas are each connected to a fixed location wireless base station transmitter/receiving radio system such as a cellular base station and each antenna/base station "cell" is deployed at different physical discrete site locations and/or orientations to form a network of overlapping cell coverage footprints. Each antenna radiation beam is continuously and cyclically steered in space or swept as a function of time in such a manner as the ensemble or network of cells provides contiguous service coverage footprint of overlapping cells, but the cell boundaries associated between adjacent base station/antenna cells are moved around spatially in time.

The antenna network of the present disclosure is suitable for use in many telecommunications systems which are deployed at a network of sites but finds particular application in cellular mobile radio networks, commonly referred to as mobile telephone networks or simply cellular networks. More specifically, the antenna network of the present disclosure may be advantageously used with cellular mobile radio access systems which employ time division user traffic scheduling, such as those based upon Long Term Evolution (LTE) 3G radio, High Speed Packet Access (HSPA), Worldwide Interoperability for Microwave Access (WiMAX) specifications, and the like. It should be noted that the present disclosure can be adapted to operate with any cellular technologies and is not limited to any one particular cellular technology.

For example, operators of cellular mobile radio networks generally employ their own base-stations, each of which includes at least one antenna. In a cellular mobile radio network, the antennas are a primary factor in defining the desired coverage area which is generally divided into a number of overlapping cells, each associated with a respective antenna and base station.

For example, each cell contains a fixed-location base station which maintains radio communication with all of the mobile radios (broadly wireless endpoint devices or simply mobile devices or terminals) in that cell. The base stations themselves are interconnected by other means of communication, e.g., fixed land-lines or microwave point to point transmission links arranged in a grid or meshed structure, thereby allowing mobile radios throughout the cellular coverage area to communicate with each other as well as with other telecommunications networks, including data servers outside the cellular mobile radio network.

For example, the antennas used in such networks are often composite devices known as phased array antennas which comprise a plurality (typically four or more), or array, of individual antenna elements, typically dipoles or patches.

One embodiment of the present disclosure relates to variable electrical beam tilt. For example, variable electrical beam tilt allows an operator of a cellular mobile radio network to alter the vertical angle of the antenna main beam of the antenna in the elevation plane to adjust the coverage area and hence cell edges to optimize for sufficient coverage level overlapping with adjacent cell footprints and also to manage and minimize co-channel interference between cells.

In particular, one embodiment of the present disclosure continuously and persistently moves cell edges around by dynamically changing (sweeping) electrical tilt in a co-ordinated manner at all antennas in a cluster of sites or a network. Furthermore, the network of base station sites requires having a site "grid" density where aggressive beam tilt angles normally (e.g., in the range five to nine degrees downtilt) can form the overlap between cell sites. Such grid density permits a large combination of valid tilt combinations from adjacent cells to permit required overlapping but in return permits a large dynamic range in tilt angle variation and hence cell edge movement. Users normally at cell edges who would normally experience modest and relatively invariant signal quality (Carrier to Interference ratio, or C/I) now experience temporal variation in signal quality C/I to which the base station scheduling algorithm can exploit by scheduling or communicating data during periods of good C/I conditions and not communicating data during poor C/I conditions. In one embodiment, the scheduling algorithms in systems such as LTE rely upon the mobile devices reporting back to the base station (on the Uplink channel) of the current downlink C/I conditions to which the scheduler will make decisions whether to and when to send data to the user based upon base station vendor scheduling proprietary algorithms, which may include Quality of Service classes (latency, minimum data rate, etc.), data buffer sizes, history of C/I quality reported and across multiple users which have to be served.

Embodiments of the present disclosure as discussed below can be used in addition to Opportunistic Beamforming, Antenna Hopping or any MIMO implementation (e.g., Spatial Multiplexing or Transmit Diversity), and thus extend the potential benefits of these techniques. Embodiments of the present disclosure enhance multi-user diversity gain from a link level or cell level, to the "network" or "cellular" level. Furthermore, Self Optimizing Network (SON) can also be used with the present disclosure where the SON may aim to re-distribute traffic equitably across the cells at a macroscopic level, the tilt sweeping technique then aims to provide C/I dithering at much shorter time intervals along the cell edges formed by the SON to provide further scheduling efficiency gains. Embodiments of the present disclosure can also be used with existing time domain scheduling algorithms implemented in the communications system, and the tilt sweeping embodiment ensures that each user distributed in space in the network will have the opportunity of receiving a peak C/I or signal quality over the tilt sweeping period.

Embodiments of the present disclosure enable significant gains in cellular network spectral efficiency and quality of service experience through at least, but not limited to, the following:

1. The cell edges formed from a fixed grid of base station sites to be moved around as a function of time, thereby giving opportunity for all users to experience an optimal signal quality and thus allow a time domain data traffic scheduling algorithm to be exploited and optimized.
2. More rapid fluctuations of signal quality for each user, thereby allowing a scheduling algorithm to serve users more often hence reducing data throughput latency for otherwise slow fading or quasi-stationary radio channels.
3. Other capacity enhancement techniques can be used in addition to the current disclosure, including MIMO techniques, Co-ordinated Multi-Point transmission (COMP), and SON.
4. Significant data throughput rates for users who otherwise would dwell at the cell edges in a network using a conventionally designed cellular network with non-varying or static radiation antenna patterns.
5. Reduce or delay the requirement for mobile operators to add further base station cell sites to achieve capacity, throughput and quality goals.

Embodiments of the present disclosure rely upon having a network of sites on a geographic grid topology where cell overlapping is sufficient for coverage redundancy between cells yet not overlapping excessively in order to control inter-cell co-channel interference. In one embodiment, a large range of possible and valid antenna pattern combinations from the network of cells can result in the cell overlap, and to which this range of antenna patterns will provide the range of antenna pattern sweeping and hence cell edge movement.

In one embodiment of the present disclosure, radiated antenna pattern variation is delivered by varying elevation pattern beam tilt angle of each antenna. A wide range of tilt angle range or dynamic range of tilt combinations is likely to be available, particularly for LTE deployments and hence exploited for the present disclosure. There are a number of reasons for this availability of tilt combination dynamic range.

For example, operators looking to deploy LTE will do so using their existing wireless infrastructure site locations which were originally chosen and designed with required overlap based on, for example, a legacy access technology such as GSM900.

Firstly, for GSM systems it is typical to have large overlapping cells for coverage redundancy but also to allow cell selection diversity when in overlapping cell regions to permit choice to equally load cells. This large overlapping was allowed since adjacent cells could use different quantities and combinations of GSM RF channels (via network and frequency planning) and thus tilting was only necessary to ensure co-channel interference was minimized between cells which re-used the same GSM channels which were often three or four cells away, depending upon available spectrum. For UMTS and other systems based on CDMA such as IS-95x and cdma2000, each cell used the same RF channel (hence no frequency planning dimension to manage co-channel interference) and as such tilting became the most important inter-cell interference control mechanism. However, CDMA systems are in fact optimized with some significant degree of overlapping in order to take advantage of Soft and Softer Handover combining gains. Empirically, systems using CDMA access technologies were often optimized using around 30% of total cell area as the overlapping region. For LTE, there is not an equivalent Soft Handover combining gain. Due to the fact that CDMA also used direct sequence spreading of data to afford some inter-cell interference protection, LTE does not have an equivalent when LTE is under full load. When LTE is under partial loading, different OFDM sub-tones/Resource Blocks can be used at different times between adjacent cells, not dissimilar to synchronized GSM frequency hopping, but when LTE is under full load, all resource block or all OFDM frequencies are used and hence there is little orthogonality. As a result, LTE networks tend to be optimized using much less overlapping and hence more aggressive tilt angles than was necessary for 2G and 3G systems.

Secondly, the link budget for LTE to provide minimum coverage service signal levels is more robust than for minimum service requirements for legacy radio access technologies, such as GSM and even UMTS. This is because LTE employs further spectral efficiency processes not present in legacy technologies. For example, it can be demonstrated that LTE can have around 5 dB or so more link budget robustness for minimum service due to MIMO being used in LTE, Time and Frequency Domain scheduling (as opposed to time domain only) being used in LTE (permitting further Multi-User Diversity Gains), LTE does not suffer from Intra-cell interference or Multiple Access Interference due to orthogonality between OFDM sub-tones on its downlink channel, and finally many LTE systems are being deployed in a proximate but slightly lower spectrum band than legacy access systems which in turn permits a relative gain when considering RF propagation losses.

This latter point can be illustrated by two major worldwide observations for LTE deployment; in the USA LTE is initially being deployed in the 700 MHz band which is just below the existing cellular 800/850 MHz band used for 2G and 3G systems; in Europe LTE is being considered for deployment in the newly harmonized UHF band in the 790-862 MHz range released by the digital dividend process of analogue to digital TV switch over, and this is proximate but lower in spectrum than the existing 900 MHz band used to support GSM900 and some UMTS900 (3G) systems. As a result, even if a GSM900 network was designed using an idealized grid of sites with for example two degrees of antenna elevation beamtilt to satisfy the GSM link budget, frequency re-use requirements and to allow contiguous coverage, then a direct overlay of LTE technology onto these sites using the digital dividend UHF band with its more robust link budget may result in a nominal LTE network requiring say five degrees of tilt at all cells for required overlapping of cells and inter-cell interference control. If variable electrical tilt antennas are installed, for example covering a tilt range of two to ten degrees, then it is possible to tilt one cell at say two degrees and its adjacent cell which faces the first cell at say ten degrees and arrive at the desired overlapping of cells. Then extending this tilt redundancy, one can vary combinations of tilts in time for these two cells as 2°/10° to 3°/18° to 4°/6° to 5°/5° to 6°/4° to 8°/13° to 10°/2°, etc and maintain desired cell overlap yet move the cell boundary around in space and time.

Because LTE has a more robust link budget, this in turn means that the LTE beam tilt can be made more aggressive for the same coverage quality as any existing access technologies, but at the same time improves the LTE inter-cell interference without losing coverage. These factors, more robust LTE link budget, less overlapping required and the need for more aggressive inter-cell interference control lead to more aggressive tilt angles which in turn permits more freedom and tilt angle combination choices across a network of sites and cells.

It should be noted that the present disclosure is not limited to tilt sweeping and includes variation of signal quality along the cell edges (by moving cell boundaries around in space and time) using all degrees of freedom for changing the radiated antenna pattern from fixed base station cells.

For the purposes of description of the disclosure and its embodiments the following terminology is used.
1. A "cell" broadly describes a base station and associated antenna; typically a cell is one physical sector of a tri-sectored base station site, and hence a base station site may have three cells.
2. "C/I" is the measure of wanted RF Carrier Signal Information power divided by all unwanted RF Signal power (and excluding the wanted signal power) across the modulation bandwidth carrying the wanted signal. The interference signal is composed of co-channel/co-frequency signals originating in other cells of the network and thermal noise.

Each antenna, associated with each cell would typically have dual cross polarization arrangement, but the present disclosure is not limited to cross polarized antenna, and includes single and multi-band, and Vertically polarized and Space Diversity antenna configurations.

FIG. 1 illustrates one embodiment of the current disclosure of providing continuously and contiguously varying radiation beam patterns across a plurality of base station cells as to move cell boundaries around and to intentionally vary the C/I signal quality experienced by mobile users to which a scheduling algorithm can respond to. In one embodiment, the cellular network 100 comprises a plurality of cellular base station sites 150 disposed at different locations across an area 151. Each base station site 150 is composed of at least one base station cell 110 comprising a baseband part or module 111, connected to a power amplification part or module 113, via baseband to amplifier interfaces 121, and 122. The power amplification part or module is in turn connected to an antenna assembly 130, via feeder cables 141, and 142. Each base station cell provides a defined geographic cellular coverage service footprint 152 dependent upon the antenna radiation pattern 160 for interacting with one or more mobile terminals 190. Each cellular coverage service footprint 152 provides sufficient over-lapping with adjacent base station cell service footprints to form a contiguous cellular network of cells.

In one embodiment, the pilot or reference signal power of each base station cell and radiation pattern associated with each cell is changed and controlled by a Base Station Power and Antenna Pattern Controlling Function 120 (broadly a controller, a processor, or server configured (e.g., configured with software instructions loaded from a memory) to perform the antenna radiation pattern sweeping function as disclosed below). The antenna radiation pattern changes may include many freedoms, including, for example, beam tilt, beam azimuth/bearing, and azimuthal beamwidth 162. The pilot/reference power and radiation pattern is changed as a function of time at each cell in such a manner as to maintain contiguous over-lapping cellular service coverage. As a result of the changing power and antenna radiation patterns, the network of cellular footprints changes, in particular the boundaries between overlapping cellular footprints move as a function of time shown by 153, 154, and 155. The power and radiation pattern changes are communicated using control signalling paths 123, which interface to base station cell 110 and base station antenna 130.

In one embodiment, a controlling function/algorithm is used for co-ordinating and controlling each antenna's radiated pattern, for example elevation tilt as a function of time. The variation in antenna radiated patterns can be synchronous or asynchronous varied relative to each other, but a common goal of the controlling function is to ensure that contiguous service coverage across the network is maintained throughout the process of changing radiated antenna patterns. This would normally require that overlapping of cell footprints are maintained to permit user mobile terminals to at least monitor broadcast and synchronization channels of the radio communications access system, thus permitting mobile terminals to register with the network (e.g., a process of synchronisation, and control information exchange between network and terminal), and perform cell handovers for mobile terminals which are moving through the network.

In one embodiment, the combination of continuously changing radiated antenna patterns (e.g., tilts) can be derived from radio planning design tools and network design processes and then these combinations of patterns (e.g., tilts) are loaded into the controlling function, or alternatively or additionally a feedback mechanism (existing control channel or otherwise) can be used where mobile terminals report C/I variations and antenna pattern variations are computed and carried out in real time.

In one embodiment, the variation in downlink received signal quality (C/I) for a fixed location user at the cell edges of a cellular network can be shown. It can be demonstrated that the variation in signal quality is due to the multipath radio channel, e.g., depicting Rayleigh like statistics of signal quality fading. Furthermore, the rate of change of signal quality is relatively slow given that the user is in a fixed position, often termed quasi-stationary fading. Signal variations do occur but are a function of the relative movement of distant scatterers in the multi-path radio channel and air pressure changes which result in a dithered slow fading signal quality response.

In one embodiment, the variation in signal quality (C/I) for the fixed location user (from simulations of an LTE network), as a function of time when synchronous tilt sweeping is being used in the network can be shown. For example, the rate of tilt sweeping can be five tilt cycles per second resulting in C/I variations of typically +/−4 dB.

In one embodiment, the resulting overall variation in signal quality (C/I) for the fixed location user when the synchronous tilt sweeping embodiment is used can be shown. For example, the rate of signal variation can be increased and the excursions of signal quality C/I will also increase accordingly. Traffic can be scheduled during periods of strong signal quality.

The present disclosure shown in FIG. 1 has many advantages, including, but not limited to:

1. A dynamically changing antenna radiation pattern is provided at each cell within a network of cells. However, the antenna radiation patterns are also changing in a co-ordinated manner to maintain coverage at all locations and to cause variation to signal quality C/I at all locations. In one embodiment, this variation in signal quality will permit significant gains in multi-user scheduling diversity gain, since a scheduling algorithm takes the opportunity to schedule or serve data to users when they are at the peaks of their signal quality, thus permitting higher instantaneous data throughput rates which in turn allow data to be delivered faster.
2. Mobile terminals will be distributed across the network; some close to sites, and some at the cell edge boundaries. Variation in signal quality will be spatially correlated and as such groups of mobile terminals will be experiencing momentarily high C/I conditions and at the same time other groups of users will be experiencing momentarily low C/I conditions. This permits de-correlation of signal quality variations across mobile terminals, which are required for efficient scheduling.
3. Rate of change of antenna radiation patterns allows for rapid fluctuations in received signal quality C/I and thus overcome quasi-static multi-path fading radio channel which would otherwise cause a mobile terminal to dwell for extended periods of time in poor signal quality conditions (i.e., resulting in scheduling latency or delay), or dwell for longer than needed periods of time in strong signal quality conditions (i.e., resulting in inefficiencies).

It should be noted that the present disclosure encompasses all methods and means for antenna pattern variation. This includes total power variation into the antenna and the actual 3-dimensional radiation pattern and its projection of into the network of cells. In the most general sense, this will be an antenna using a general phased array of antenna elements with a beamforming algorithm. Practically however, most base station antenna systems are designed and configured to provide tangible variation in beam tilt, and sometimes azimuthal beamwidth and azimuthal bearing. For the purposes of clarity, the present disclosure is described using such (more familiar) terminology rather than descriptions of beamforming algorithms applied to antenna arrays. Moreover, the present disclosure is not limited to a particular antenna system, whether this be an active antenna array, a passive antenna array, space diversity or X-Polar diversity arrangement. Embodiments of the present disclosure vary the collective footprint of overlapping cells to maintain coverage yet to induce signal quality variations to which a scheduling algorithm can take advantage of to exploit multi-user scheduling diversity gains. It should be noted that although FIG. 1 depicts a cellular cluster of cells which are arranged in a regular grid (for clarity), the present disclosure can be applied to all non-regular grids as well.

Figure 2:
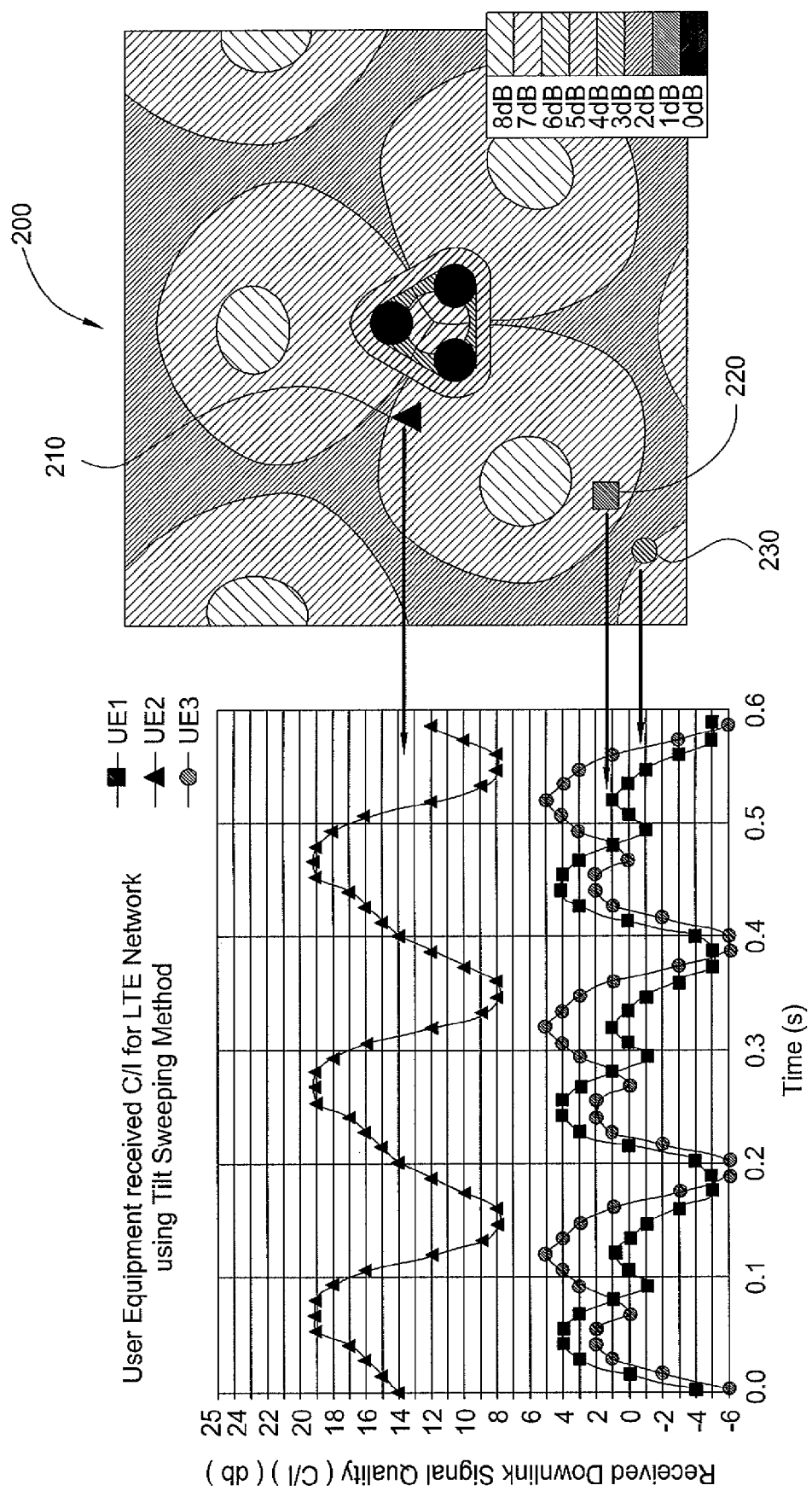
FIG. 2 illustrates by example the cyclic temporal variation of signal quality (C/I) at 3 different locations near to cell edges within the network of cells of one embodiment of Tilt Sweeping.

FIG. 2 illustrates by example the cyclic temporal variation of signal quality (CA) at three different locations 210, 220, and 230 near to the cell edges within the network 200 of cells of one embodiment of tilt sweeping. More specifically, FIG. 2 illustrates an example of signal quality (C/I) variation of three random locations within the cluster of 7× tri-sectored sites using the embodiment of synchronous tilt sweeping. It is demonstrated that significant variation in C/I may result with which a scheduler can exploit scheduling of data when peak C/I is experienced and reported by user mobile terminals within the network. Furthermore, mobile user terminals relatively close to the cell centre, whilst receiving relatively good signal quality (CA), will also undergo significant signal quality variation which also, as an additional benefit of the present disclosure and embodiment, will assist the scheduling algorithms of the radio communications system.

Figure 3:
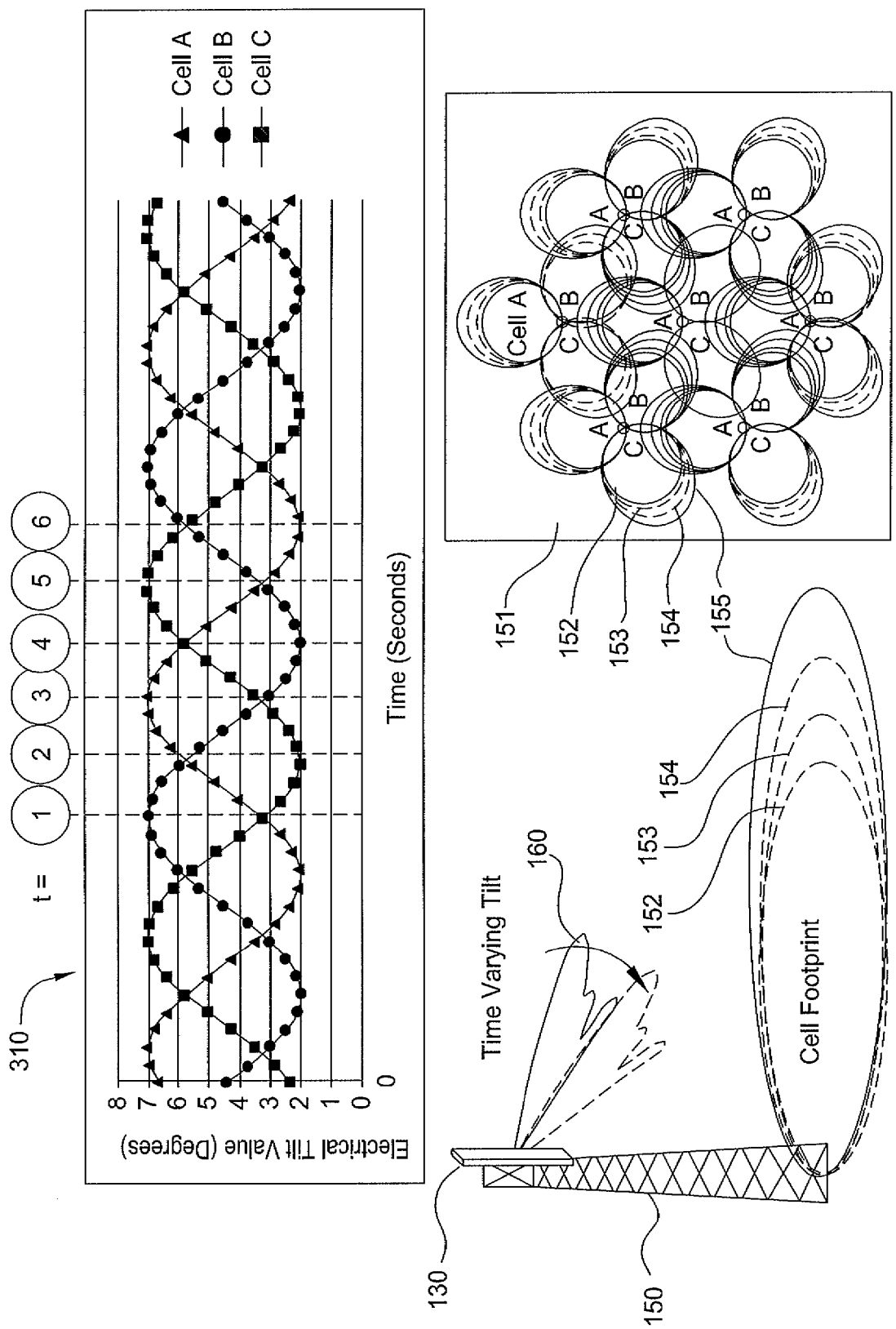
FIG. 3 illustrates one embodiment of a "tilt sweeping" as a number of discrete time intervals over one cycle of tilt sweeping, where antenna vertical beam tilt is varied synchronously and continuously as a function of time at all antennas in a manner as to maintain contiguous service coverage.

FIG. 3 illustrates one embodiment of a tilt sweeping as a number of discrete time intervals over one cycle of tilt sweeping, where antenna vertical beam tilt is varied synchronously and continuously as a function of time at all antennas in a manner as to maintain contiguous service coverage. More specifically, a first embodiment of the present disclosure is shown in FIG. 3 where it is illustrated using a time synchronous tilt sweeping method on a cellular network topology based upon tri-sectored base station sites using directional antennas. For example, most cellular base station sites are tri-sectored using antennas which radiate with azimuthal beamwidths typically between 60 and 90 degrees and elevation beamwidths of between 5 and 10 degrees. However, the present disclosure is not limited to tilt sweeping and the present disclosure includes variation of signal quality along the cell edges (e.g., by moving cell boundaries around in space and time) using all degrees of freedom for changing the radiated antenna pattern from fixed base station cells.

In one embodiment, the present disclosure is particularly suitable for tilt sweeping since this can be readily applied to most cellular networks. Furthermore, whilst azimuthal sweeping is possible, the range of practical or valid azimuthal bearings at cells across a cluster of cells which maintains contiguous coverage is limited due to the relatively tight tessellation of cells in the azimuth or ground based plane of reference. Sweeping in tilt angle is perpendicular to the tessellated plane and therefore allows a wider range of signal quality variation along cell boundaries.

In one embodiment, each antenna assembly has independent adjustment of the angle of electrical tilt for each cell. The present disclosure allows individual, independent adjustment of the radiated antenna pattern for each antenna by enabling separate control access to the adjustment mechanism for antenna.

FIG. 3 aims to communicate that under the tilt sweeping embodiment of the present disclosure, significantly higher albeit momentary C/I signal quality and hence data rates can be experienced at any location, suitable for a scheduled based radio communications access system, such as LTE. More specifically, FIG. 3 illustrates one embodiment of the present disclosure where the antenna radiation pattern of each base station cell is varied (i.e., cyclically sweep) using a variable beam tilt only with conventional variable or remote electrical tilt base station antennas. Again, FIG. 3 depicts a cellular cluster of cells which are arranged in a regular grid (for clarity), but the present disclosure can be applied to all non-regular grids as well.

In one embodiment, tilt sweeping is readily implementable given that most base station antenna deployments are offered with remote electrical tilt (RET) functionality. As such the antenna radiation pattern control infrastructure and protocols are in place to allow varying beam tilt.

Furthermore, azimuthal beam variations and azimuthal beamwidth variations are not excluded from the present disclosure, but some antenna systems may not offer variable azimuth bearing or beamwidth variation. Under such scenario, tilt sweeping is seen as a more feasible and practical solution.

In one embodiment, FIG. 3 depicts an embodiment of changing the antenna radiation pattern by changing the vertical plane beam tilt only. In this embodiment, a network of tri-sectored cellular base stations is given as an example disposed across an area 151 which creates a network of inter-linking and over-lapping cellular footprints. For example, the antenna pattern vertical beam tilt for each "sector" or cell (e.g., Cell A, Cell B and Cell C) of each tri-cell base station is changed in accordance with a function of time as shown in the upper portion 310 of FIG. 3. In the upper portion 310, a tilt variation between 2 degrees and 7 degrees of the mainbeam vertical tilt is used which follows a sinusoidal variation in tilt angle as a function of time. Each cell's tilt angle varies in this manner, where each cell's tilt angle is "phased" in time as depicted in the upper portion 310.

In one embodiment, FIG. 3 depicts six (6) discrete time intervals of one cycle of tilt variation between 2 and 7 degrees and the corresponding overlapping cellular service footprints. It should be noted that the present disclosure is not limited to any particular number of discrete time intervals of one cycle of tilt variation. It should be noted that only one cell is shown for clarity and annotated to illustrate the changing footprint as a function of time 152, 153, 154, and 155. The result would be a continuously and cyclical variation of contiguous overlapping cellular footprints. In one embodiment, continuously and cyclical variation comprises at minimum of three variations or more. Thus, a mobile station located near to the cell edge boundaries then experiences fluctuations in the signal quality C/I and relies upon the scheduling functions and algorithms present within the radio-access protocol/system to serve and schedule data when the mobile station is dwelling on momentarily good C/I.

Figure 4:
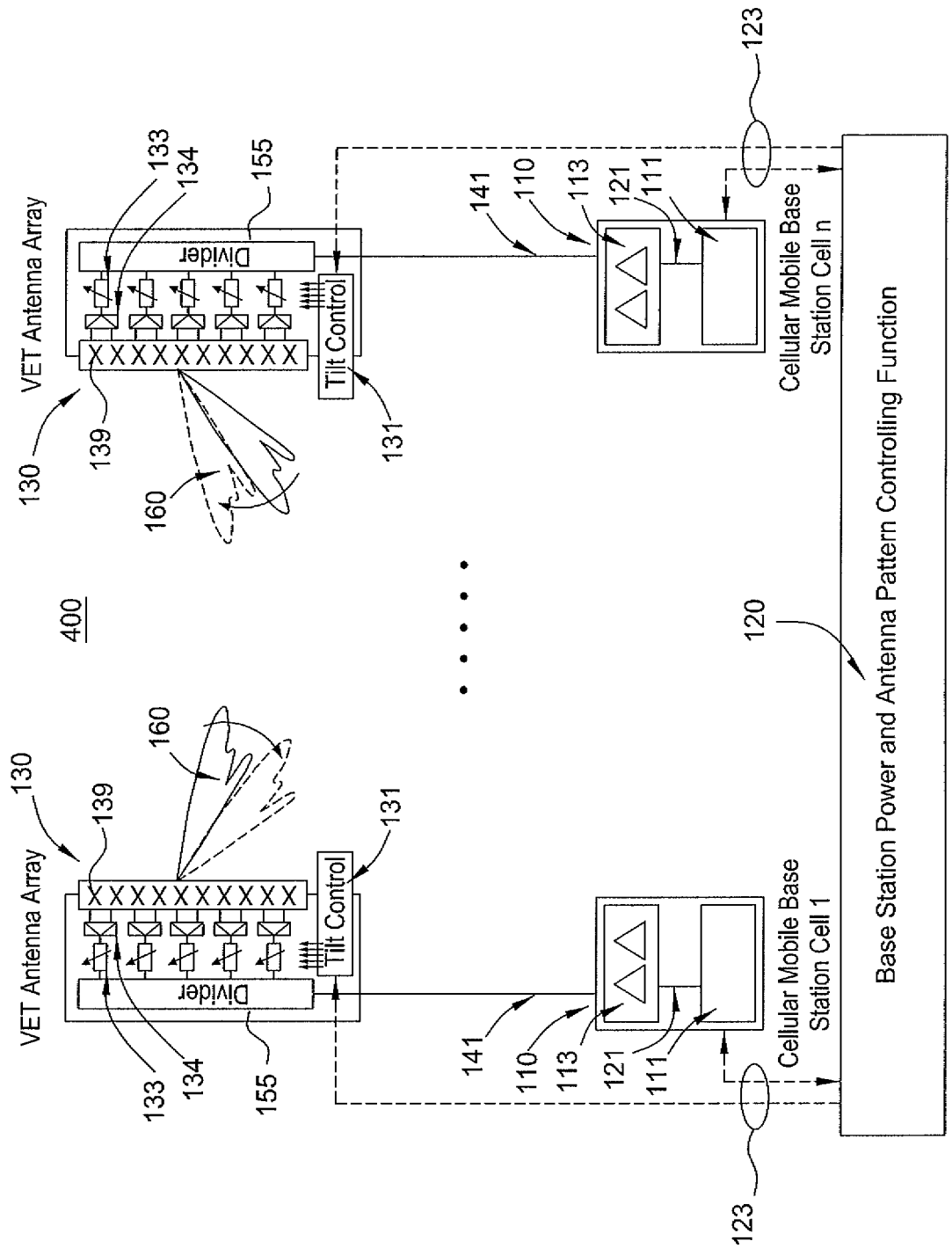
FIG. 4 illustrates one embodiment of tilt sweeping using conventional VET antennas.

FIG. 4 illustrates one embodiment of a cellular network 400 using tilt sweeping with conventional variable electrical tilt (VET) antennas. Many cellular base station antenna deployments have the facility for variable electrical beam tilt. This feature is provided as a means to tune and optimize a network of over-lapping cells, without having to mechanically tilt the antenna and/or having to climb a base station tower to adjust beam footprints. FIG. 4 depicts one embodiment of the present disclosure using conventional variable electrical tilt (VET) or remote electrical tilt (RET) antenna arrays. RET simply means that the tilt control of the VET antenna can be performed remotely such as in a ground based base station cabinet or even at a remote network operations centre.

Furthermore, most VET antennas are in fact a construction of two separate antenna arrays in a cross-polarized configuration (X-Polar antenna); normally disposed and termed as +45 and −45 arrays by virtue of the linear polarisation each array creates. In one embodiment, such VET antennas have a tilt control interface 131 which controls and changes the relative phase of the RF signals to different antenna elements or groups of elements in each of the 2× orthogonally polarized antenna arrays in such a manner as to create varying but substantially linear phase slope across the antenna array face, which, in turn, leads to varying vertical plane beam tilt.

In one embodiment, FIG. 4 illustrates a power dividing network 155 which takes input signal on path 141 and divides the power into a plurality of branches; each branch is then connected to an individual phase shifting device 133 and then connected directly to a radiating element in the antenna array 139, or connected to groups of radiating elements (broadly antenna elements) via a splitting device 134. For example, the antenna elements may comprise single-linear-polarized, dual-linear-polarized, single-circular polarized, or dual-circular polarized elements. In this embodiment, the Base Station Power and Antenna Pattern Controlling Function 120 (broadly a controller) communicates antenna tilt changes via signalling connections or paths 123 which interface to the VET antenna Tilt Control 131 normally located at, on, or near to the VET antenna. FIG. 4 illustrates this embodiment where one of the two available orthogonal polarisations of the antenna is shown for clarity.

Figure 5:
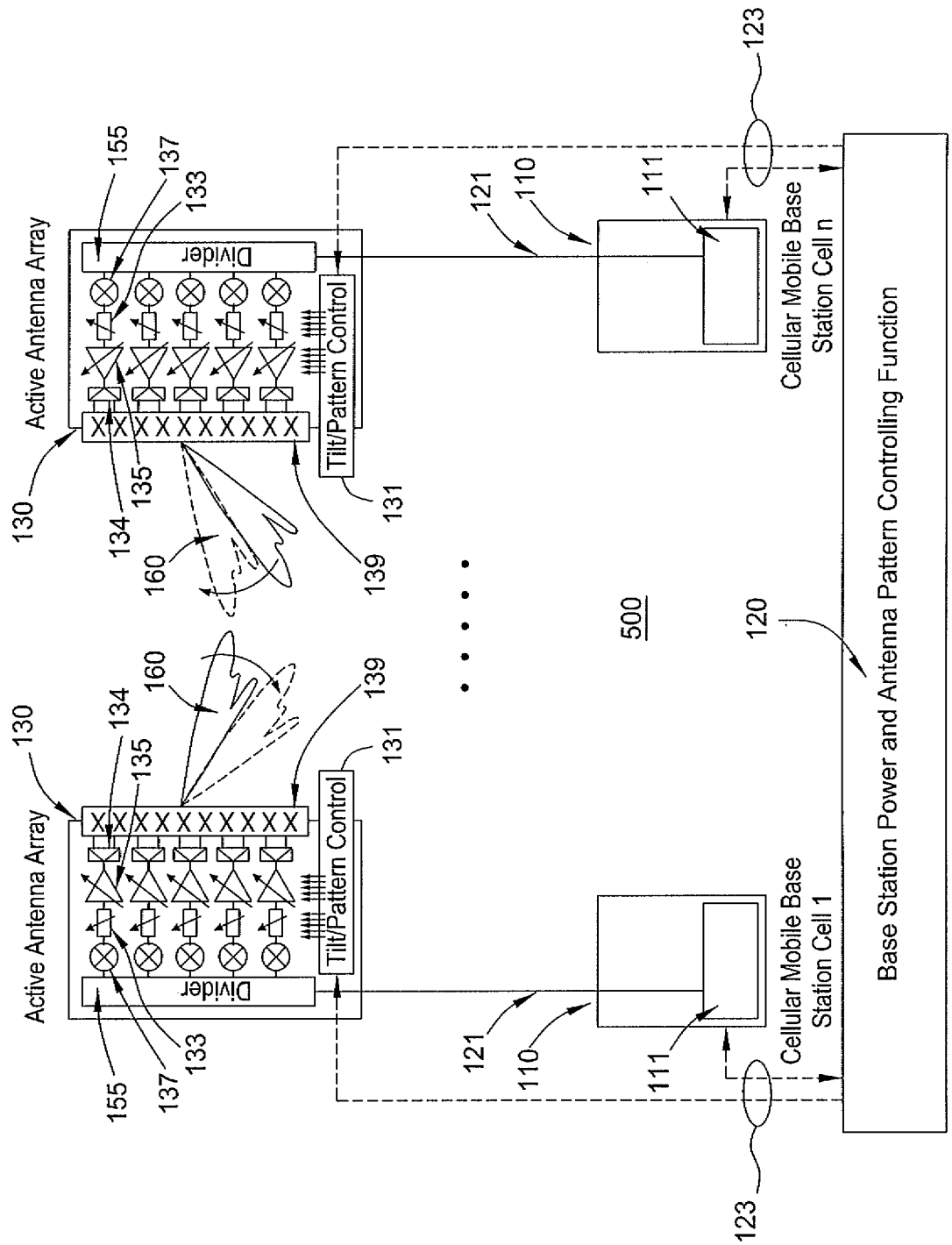
FIG. 5 illustrates one embodiment of tilt sweeping using active antennas.

FIG. 5 illustrates one embodiment of a cellular network 500 using tilt sweeping with active antennas. In one embodiment, an active antenna system is defined by the fact that each antenna element or groups of antenna elements are driven by individual power amplifiers in the antenna array for the Downlink channel (and Low Noise Amplifiers for the Uplink channel). Active antenna systems may employ variable phase and amplitude control functions associated with each amplifier where phase/amplitude weights are processed before high power RF amplification, often at low power RF or even baseband stages. As such, active antennas can create a wide range of variable antenna radiation patterns than conventional variable electrical tilt only antennas since phase/amplitude control to each element is afforded. Furthermore, since phase/amplitude control is carried out before high power RF amplification then electronic or digital phase shifting can be performed which in turn means no moving parts are required in the antenna assembly.

In one embodiment, using active antenna arrays can permit greater rates of change of antenna radiation patterns, and remove any potential reliability issues associated with motor driven RET control mechanisms. This will permit a greater range or dynamic range of patterns to be exploited and hence lead to greater variation of signal quality across the network of cells.

In this embodiment, the antenna system is an active antenna array; active by virtue of the fact each antenna element or groups of elements in the array of elements have independent signal processing and amplification processes. Active antenna systems can vary in precise configuration, but can be generally classed as having multiple, independent amplification stages associated with separate antenna elements of groups of elements.

Referring to FIG. 5 in one embodiment, the baseband part or module 111 of a base station cell 110 is connected to the active antenna by means of a baseband interface 121 normally delivered by a fibre optical connection (such as an Open Base Station Alliance Interface; OBSAI or Common Public Radio Interface; CPRI standards based interface), since it is desirable to have the baseband part or module 111 and the active antenna 130 (which now includes the amplification function) physically separate from one another.

In FIG. 5, a generic active antenna architecture is depicted comprising of a dividing component 155 which distributes the baseband signal from fibre/interface 121 into a plurality of branches where each branch is processed independently, which includes an upconversion processing module 137, a phase shifting module 133 and a variable amplitude/amplification module 135 which in turn is connected to individual or, via a splitter 134, to groups of radiating antenna array elements 139.

In one embodiment, the active antenna has a Variable Electrical Tilt (VET) control interface 131 which is connected to the Base Station Power and Antenna Pattern Controlling Function 120 (broadly a controller). The VET control interface 131 receives control commands to change vertical plane beam tilt 160. FIG. 5 illustrates this embodiment where one of the two available orthogonal polarisations of the active antenna is shown for clarity.

However, perceived disadvantages of active antenna systems include the fact there are active devices at the top of a tower which can risk reliability requirements and Mean Time to Repair (MTTR), since a tower climb is required to repair or replace an active antenna system. However, the cellular industry is becoming more comfortable with having active electronics at the top of the tower, as evidenced in the emergence of Remote Radio Heads (RRHs) or indeed for rooftop installations which should not degrade MTTR, since a tower climb is not required.

However, active antennas can also be perceived to be limiting in the fact that if an operator wishes to swap out an antenna, perhaps replacing an original single band antenna for an antenna which is multi-band capable, then replacement of active antennas for the same functionality are naturally more expensive. Furthermore, an operator who deploys a RRH connected to a conventional passive antenna gets the benefits of the RRH in that power is not lost in feeder cables from an otherwise conventional non-RRH base station installation, yet the operator can swap out (passive) antennas or indeed upgrade RRH units for higher-power, or more-efficient RRHs later and keep the same (passive) antennas. Additionally, an operator may wish to change RRH vendors and antenna vendors during the lifetime of the cellular site as new technologies and bands are deployed and integrated into the network. Having a RRH and passive antennas affords this flexibility together with a wider eco-system of supply. Therefore it can be advantageous to use passive antennas with RRH solutions.

Figure 6:
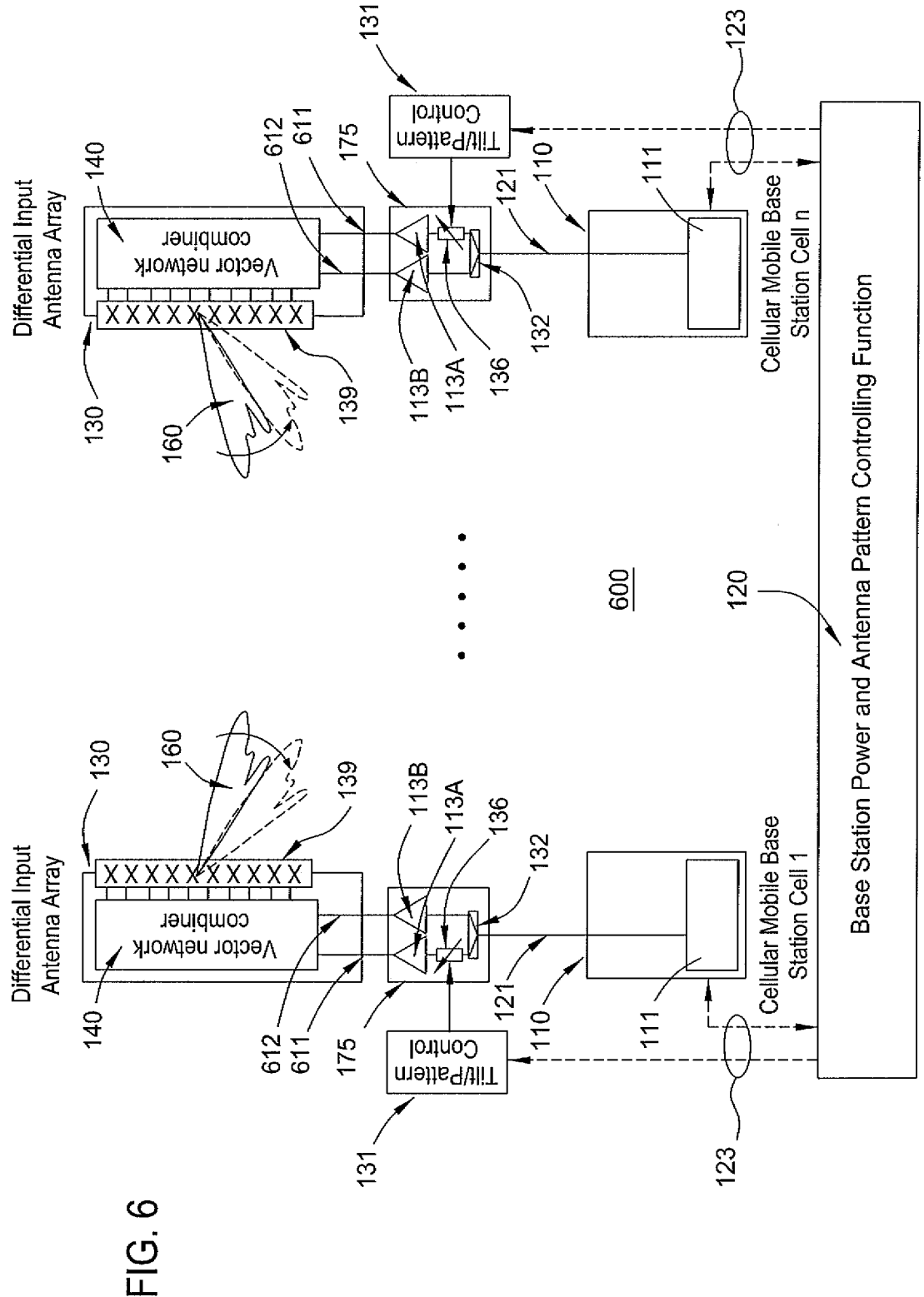
FIG. 6 illustrates one embodiment of tilt sweeping using modified base station cell amplification parts and differential input VET antennas.

FIG. 6 illustrates one embodiment of a cellular network 600 using tilt sweeping with modified base station cell amplification parts and differential input VET antennas. Conventional antennas require motor driven RET to permit beam tilt variations. One embodiment of the present disclosure implements an antenna solution which is based on modified RRH unit which can be configured for use with differential input VET antennas or with conventional passive antennas. Examples of differential input VET antennas are disclosed in U.S. Pat. Nos. 7,433,713, and 7,450,066, which are herein incorporated in their entirety by reference.

The differential input VET antennas offer the advantages that the antenna can remain as a completely passive device, yet the modified RRH architecture permits electronic or digital beam tilt without motors or moving parts. As such, greater rates of tilt change can be exploited and reliability concerns in using motor driven RET antennas are eliminated.

Referring to FIG. 6, in one embodiment, the antenna is a VET antenna but uses a corporate feed network 140 which is a vector network combiner which has, not one RF port per polarisation, but two ports per polarisation, where vertical beam tilt is a function of the RF phase difference applied onto the two input ports per polarisation, i.e., a differential input VET antenna. The advantage of such an antenna is that a single RF phase shifting device can be used to control beam tilt in a multi-element antenna array as opposed to having to use multiple mechanically coupled phase shifting devices as is conventionally implemented in VET antennas. This advantage permits a relatively simple modification to the base station cell amplification part 175 for each polarisation branch. In one embodiment, the modification comprises two Power amplifiers 113*a* and 113*b* (of half power) instead of one amplifier which provides the differential input to the two (differential) input ports for each polarisation of the antenna.

In FIG. 6, an example configuration of this embodiment is illustrated. The base station cell baseband interface for one branch 121 is connected to the modified base station cell amplification part 175. The baseband interface to the modified amplifier is split, e.g., via a splitter 132 into two equal branches and undergo identical and necessary upconversion, filtering and any pre-amplification processing for each branch. One branch however has a low power phase shifting device 136 which can be varied to change relative phase difference across the two branches which are input to the two amplifiers 113a and 113b. The phase shifting device 136 can be applied at the low power RF or indeed can be applied directly at baseband (before any upconversion processes). The resulting RF amplified signal at paths 611 and 612 present an amplified differential signal which is connected to one polarisation of the antenna. The advantage in this configuration is that the phase shifting device can be made as an low-power electronic phase shifter (when applied to a low power RF or IF signal) or is a phasor rotation process (when applied at baseband) and thus requires no moving parts or mechanical components to create phase shift, and hence beam tilt from the antenna array. A further advantage of this configuration is that the antenna part 130 remains as a completely passive device and as such can be manufactured at a fraction of the cost of an active antenna, and with less perceived reliability/maintainability issues. Moreover the modified amplification part 175 can be configured and designed to support both differential input VET antennas (requiring differential input signals) and conventional single port per polarisation VET antennas. This would be achieved by-passing the electronic/digital phase shifting process and coherently combining the outputs of the two amplifiers into one single composite output which connects to the conventional antenna.

In one embodiment, the modified amplification part 175 comprises a Variable Electrical Tilt (VET) control interface 131 which is connected to the "Base Station Power and Antenna Pattern Controlling Function" 120 (broadly a controller). The VET control interface 131 receives control commands to change vertical plane beam tilt 160, according to the present disclosure. FIG. 6 illustrates this embodiment for only one of the two available orthogonal polarisations of the active antenna for clarity.

In one embodiment, the present disclosure is advantageously implemented with radio-access protocols which use time domain traffic scheduling for example as employed with LTE, WiMAX and HSPA access systems and as such, schedulers employing max C/I or Proportional-Fair scheduling algorithms will attempt to schedule/serve traffic when mobile terminals have momentarily good signal (C/I) quality conditions. Such scheduling schemes rely upon fast, periodic measurement of the downlink C/I signal quality by the mobile and reporting of such via the uplink channel.

Embodiments of the disclosure use synchronized variation in antenna radiation patterns across multiple cells. This variation can be cyclical as depicted and embodied in the tilt sweeping embodiments. In one embodiment, in the case that tilt sweep cycles repeat at a significantly greater rate than the coherence time of the inherent multi-path fading profile of the radio channel between the base station cell and any particular mobile terminal, then the C/I signal quality variations between cycles will be somewhat predictable and therefore scheduling algorithms can anticipate when good C/I signal quality conditions are likely to occur. This allows the scheduler to effectively ignore mobile reported downlink C/I signal quality measurements for periods of time (when anticipating poor C/I conditions). This in turn means less loading of the scheduling algorithms for efficiency.

The present disclosure is not limited to any particular algorithm for scheduling; instead, anticipatory scheduling can be included in any existing scheduling algorithms.

In one embodiment, a range of antenna radiation pattern temporal rates of change, e.g., optimal tilt sweeping rates are disclosed. In some embodiments, a tilt sweeping rate of the order of a few tilt sweep cycles per second is optimal for a cellular LTE mobile broadband network operating in the 700-900 MHz band range. For example, the optimal rate of sweeping may be a function of the cellular network spectrum band/frequency, radio channel environment, expected mobile user mobility (speeds), the particular base station vendor scheduling algorithm and the wider Radio Access Network (RAN) configuration parameters. Furthermore, the present disclosure provides enhanced Quality of Service and in particular peak data rates for mobile users who would be normally static (without mobility) and who may experience quasi-static slow multi-path fading.

Additionally, radio resource management protocols such as those used in cellular radio access systems for cell handover (or hand-off) and registration with a cell at mobile terminal power-up can be considered when using the current disclosure. In a worst case scenario, as cell boundaries move around in time, it is undesirable for mobile terminals to try and perform handovers as this would quickly overload control signalling within the network. This embodiment includes valid settings of Radio Access Network (RAN) cell configuration parameters which can accommodate radiation pattern variation as proposed in the present disclosure. Such parameters will include settings which invoke/execute cell re-selection (handover), e.g., the algorithm may consider timing parameters, and cell C/I values, and etc on which the RAN management function makes a decision to perform a handover.

Figure 7:
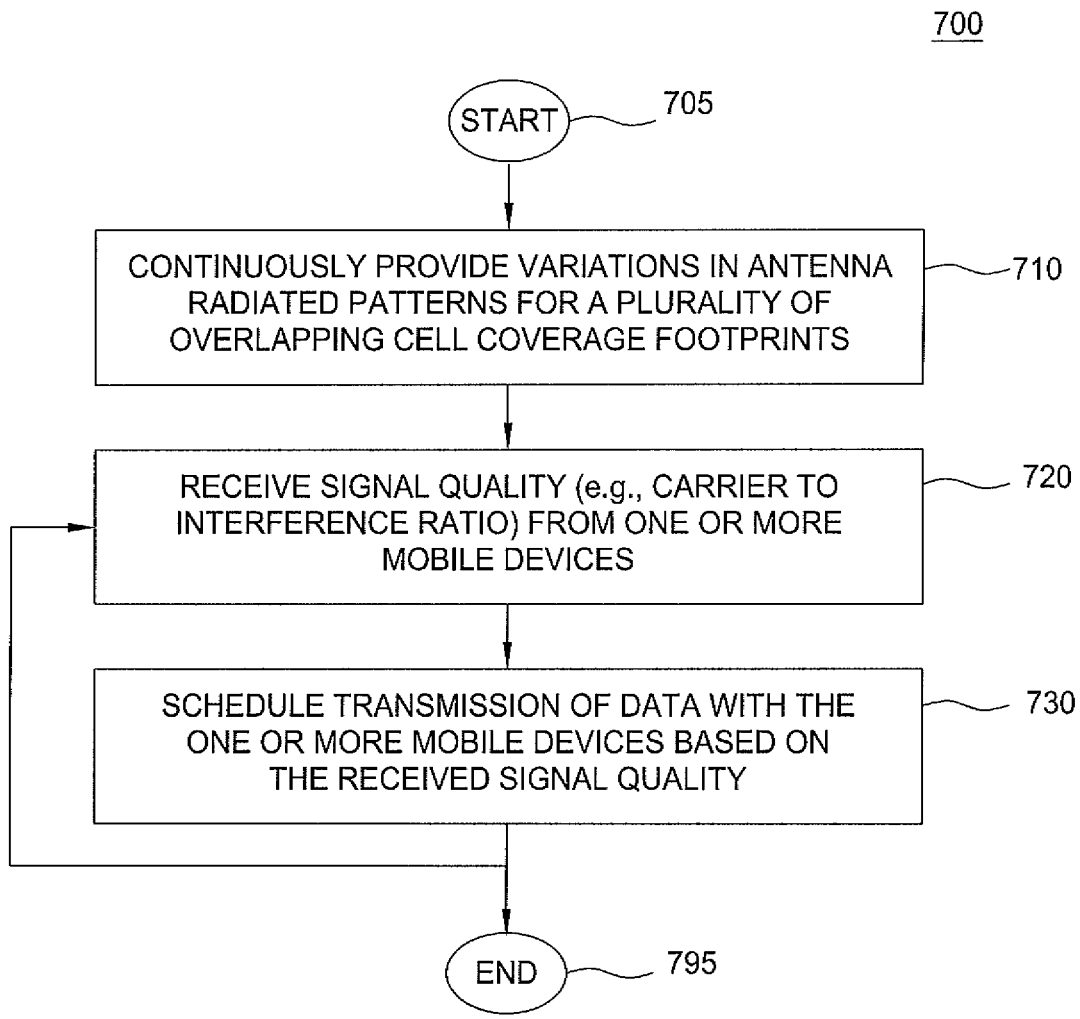
FIG. 7 illustrates a flow chart of a method for providing continuous antenna radiation pattern sweeping.

FIG. 7 illustrates a flow chart of a method 700 for providing continuous antenna radiation pattern sweeping. For example, method 700 can be implemented by the controller 120 as discussed above. Method 700 starts in step 705 and proceeds to step 710.

In step 710, the method 700 continuously provides variations (e.g., a first variation to a first base station and a second variation to a second based station and so on) in the antenna radiation patterns across a plurality of overlapping cells or more specifically, cell coverage footprints.

In step 720, the method 700 receives a signal quality (e.g., carrier to interference ratio C/I) from each of one or more mobile devices. For example, each of the one or more mobile devices 190 may be sending signal quality to the controller 120 on a periodic basis. In one embodiment, step 720 can be deemed to be an optional step.

In step 730, method 700 schedules transmission of data with the one or more mobile devices based on the received signal quality. For example, for each of the one or more mobile devices, the controller 120 will be able to deduce a time period in which a mobile device has a highest C/I (or above a predefined acceptable level). Using that information, the controller 120 will be able to schedule e.g., data transmissions for a time period, with each of the one or more mobile devices in a manner in which each respective mobile device is likely experiencing a relatively high C/I. Method then ends in step 795 or returns to step 720.

It should be noted that although not specifically specified, one or more steps of method 700 may include a storing, displaying and/or outputting step as required for a particular application. In other words, any data, records, fields, and/or intermediate results discussed in the method can be stored in a non-transitory computer readable medium, displayed and/or outputted to another device as required for a particular application.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for a wireless network, comprising:
   a first base station associated with a first antenna assembly for providing a first antenna radiation pattern over a first footprint of a first cell;
   a second base station associated with a second antenna assembly for providing a second antenna radiation pattern over a second footprint of a second cell, wherein there is an overlap between the first footprint and the second footprint; and
   a controller for controlling the first base station and the second base station to continuously provide a variation of the first antenna radiation pattern and the second antenna radiation pattern in a coordinated manner for maintaining the overlap between the first footprint and the second footprint, wherein the variation of the first antenna radiation pattern and the second radiation antenna pattern comprises at least one cycle two cycles per second, wherein the variation comprises a vertical beam tilt variation.

2. The system of claim 1, wherein the first antenna assembly or the second antenna assembly comprises an array of antenna elements.

3. The system of claim 2, wherein the array of antenna elements comprises single-linear-polarized elements, dual-linear-polarized elements, single-circular polarized elements, or dual-circular polarized elements.

4. The system of claim 1, wherein the maintaining the overlap between the first footprint and the second footprint provides a substantially contiguous cellular coverage.

5. The system of claim 1, wherein the controller schedules data transmissions to respective mobile devices supported by the first base station and the second base station in accordance with the variation of the first antenna radiation pattern and the second antenna radiation pattern.

6. The system of claim 1, wherein the wireless network operates in accordance with a Long Term Evolution (LTE) specification, a High Speed Packet Access (HSPA) specification, or a Worldwide Interoperability for Microwave Access (WiMAX) specification.

7. The system of claim 1, wherein the vertical beam tilt variation creates a tilt sweeping across the first cell and the second cell.

8. The system of claim 7, wherein the tilt sweeping is a synchronous sweeping or an asynchronous sweeping.

9. The system of claim 1, wherein the first antenna assembly or the second antenna assembly comprises a Variable Electrical Tilt (VET) antenna assembly.

10. The system of claim 1, wherein the first antenna assembly or the second antenna assembly comprises an active antenna assembly.

11. The system of claim 1, wherein the first antenna assembly or the second antenna assembly comprises a differential input antenna assembly.

12. The system of claim 1, wherein the controller schedules data transmissions to respective mobile devices supported by the first base station and the second base station in accordance with responses pertaining to a signal quality received from each of the respective mobile devices.

13. The system of claim 1, wherein the signal quality comprises a carrier to interference ratio.

14. A method for varying antenna radiation patterns at a plurality of base station cells arranged as a wireless network, comprising:
   providing a first variation to a first antenna radiation pattern of a first base station associated with a first antenna assembly for providing the first antenna radiation pattern over a first footprint of a first cell; and
   providing a second variation to a second antenna radiation pattern of a second base station associated with a second antenna assembly for providing the second antenna radiation pattern over a second footprint of a second cell in a coordinated manner with the first variation to the first antenna radiation pattern and for maintaining an overlap between the first footprint and the second footprint, wherein the second variation to the second radiation antenna pattern and the first variation to the first antenna radiation pattern each varies at a same rate comprising at least one cycle two cycles per second, wherein each of the first variation and the second variation comprises a vertical beam tilt variation.

15. The method of claim 14, wherein the first antenna assembly or the second antenna assembly comprises an array of antenna elements, and wherein the array of antenna elements comprises single-linear-polarized elements, dual-linear-polarized elements, single-circular polarized elements, or dual-circular polarized elements.

16. The method of claim 14, wherein the maintaining the overlap between the first footprint and the second footprint provides a substantially contiguous cellular coverage.

17. The method of claim 14, further comprising:
   scheduling data transmissions to respective mobile devices supported by the first base station and the second base station in accordance with the first variation of the first antenna radiation pattern and the second variation of the second antenna radiation pattern.

18. The method of claim 14, further comprising:
   scheduling data transmissions to respective mobile devices supported by the first base station and the second base station in accordance with responses pertaining to a signal quality received from each of the respective mobile devices.

* * * * *